(12) United States Patent
Kim et al.

(10) Patent No.: US 7,075,916 B2
(45) Date of Patent: Jul. 11, 2006

(54) APPARATUS FOR CANCELLING INTERFERENCE IN CDMA SYSTEM USING MULTIPLE TRANSFER RATES AND METHOD THEREOF

(75) Inventors: Young Wha Kim, Dajon (KR); Seong Rag Kim, Daejon (KR); In-Kyeong Choi, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 1057 days.

(21) Appl. No.: 09/930,217

(22) Filed: Aug. 16, 2001

(65) Prior Publication Data

US 2002/0075837 A1    Jun. 20, 2002

(30) Foreign Application Priority Data

Dec. 19, 2000    (KR) ............................... 2000-78635

(51) Int. Cl.
*H04B 7/216* (2006.01)
(52) U.S. Cl. ...................... 370/342; 375/148; 375/346; 370/335
(58) Field of Classification Search ................ 370/335, 370/342; 375/346, 148; 455/63.1, 296
See application file for complete search history.

(56) References Cited

U.S. PATENT DOCUMENTS 5,644,592 A    7/1997    Divsalar et al.

(Continued)

FOREIGN PATENT DOCUMENTS

KR    10-0255565    2/2000

OTHER PUBLICATIONS

Neiyer S. Correal; A DSP-Based DS-*CDMA MulTiuser Receiver; Employing Partial Parallel Interference Cancellation*; IEEE, R. Michael Buehrer, Member, IEEE, and Brian D. Woerner, Member IEEE, 1999; IEEE, vol. 17, No. 4, Apr. 1999, pp. 613-630.

*Primary Examiner*—Alpus H. Hsu
*Assistant Examiner*—Steven A Blount
(74) *Attorney, Agent, or Firm*—Mayer, Brown, Rowe & Maw LLP (57) ABSTRACT

The present invention relates to a receiver applicable to a code division multiple access system having multiple transfer rates. In a CDMA system, when performing a de-spreading process to extract information from received data in which various terminal signals or multiple path signals are asynchronously mixed, interference between a plurality of users or paths tends to occur. The present invention proposes an interference canceller for effectively canceling the interference between the users or paths. For this, the present invention implements a parallel interference canceller for estimating in parallel interference signals from asynchronously received signals and canceling the estimated interference signals from the received signals. In the present invention, when implementing a parallel interference canceller for asynchronously received signals, as bit information of the received signals is not aligned in the same time frame, the following conditions are considered. First, the accuracy of interference cancellation is maintained. Second, the time delay of signal processing is minimized to minimize the time delay of the entire system. In the present invention, in order to achieve these objects, reproduction of interference signals and the subtraction operation are optimized based on the arrival points and end points based of the fastest signal and the latest signal among the asynchronously received signals.

10 Claims, 7 Drawing Sheets

U.S. PATENT DOCUMENTS

| | | | |
|---|---|---|---|
| 5,978,413 A * | 11/1999 | Bender | 375/149 |
| 6,157,847 A * | 12/2000 | Buehrer et al. | 455/561 |
| 6,192,042 B1 * | 2/2001 | Seo | 370/342 |
| 6,363,103 B1 * | 3/2002 | Buehrer et al. | 375/148 |
| 6,404,760 B1 * | 6/2002 | Holtzman et al. | 370/342 |
| 6,496,534 B1 * | 12/2002 | Shimizu et al. | 375/148 |
| 6,529,495 B1 * | 3/2003 | Aazhang et al. | 370/342 |
| 6,724,809 B1 * | 4/2004 | Reznik | 375/148 |
| 6,741,634 B1 * | 5/2004 | Kim et al. | 375/144 |
| 2004/0196892 A1 * | 10/2004 | Reznik | 375/148 |

* cited by examiner

APPARATUS FOR CANCELLING INTERFERENCE IN CDMA SYSTEM USING MULTIPLE TRANSFER RATES AND METHOD THEREOF

TECHNICAL FIELD

The invention relates generally to an improved receiver applicable to a code division multiple access (CDMA) system in which users have various transfer rates. More particularly, the present invention relates to a subtraction interference cancellation apparatus and method capable of estimating and canceling the interference signals between multiple users or communication channels.

BACKGROUND OF THE INVENTION

The present invention relates to a receiver for a code division multiple access (CDMA) system in which individual users have various transfer rates. The present invention generally belongs to digital interference noise filtering technology. Conventional technologies include a serial interference canceller, parallel interference canceller and a hybrid interference canceller. The present invention is concerned with the parallel interference canceller among the conventional technologies. In particular, the present invention is concerned with a parallel interference canceller in an asynchronous CDMA receiver having multiple transfer rates.

Representative conventional technologies relating to the interference canceller have been developed by Virginia Technology Institute of the United States and ETRI of Korea. First, ETRI proposed a technique for canceling interference in a block unit by collecting bits or symbols. This technique has a problem that the capacity of a memory buffer has to be increased to implement the system. Particularly, as this technique employs a method of checking asynchronously overlapped portions more than once, there is a problem that the accuracy of detection at the overlapped portions is lowered.

Meanwhile, Virginia Technology Institute proposed a sequential interference cancellation scheme. In this scheme, however, the calculation process for detecting and reproducing signals, the signal reduction process and the de-spreading process for restoring original signals from which interference is canceled are not arranged in order but mixed. Thus, the calculation contents and the object data differ for each bit of calculation. Therefore, this method requires much load of control processing in addition to data calculation. Thus, when this method is implemented in hardware, it is difficult to improve the processing speed and control of the processing flow is complicated.

SUMMARY OF THE INVENTION

It is therefore an object of the present invention to provide a subtraction interference cancellation apparatus and method which are easy to implement in a hardware and minimize the processing delay time of a CDMA receiver used under multiple transfer rate transmission and reception environment.

In order to accomplish the above object, the apparatus according to the present invention for removing interference from asynchronously received signals in a code division multiple access system having multiple transfer rates comprises a signal reproducing means for performing de-spreading operation of the received signals for respective users or said paths and then reproducing said signals using a channel estimation value, a remaining signal generating means for summing the reproduced signals on a corresponding receive time axis and subtracting the summed signals from the input received signals to generate remaining signals, a de-spreading means for summing the remaining signals generated by the remaining signal generating means to the signals for the respective users or paths to generate signals from which interference is cancelled and for performing a de-spreading operation on the interference cancelled signals, a rate detection means for receiving said signals for respective users or paths to detect multiple transmission rates and an asynchronous trigger point for respective users, and a controller for controlling the signal reproduction means, the remaining signal generating means and the de-spreading means using the multiple rates and the asynchronous trigger point for respective users.

In another aspect of the invention, the present invention provides a method for sequentially canceling parallel interference of receive signals for respective users or paths, which are asynchronously received in a code division multiple access having multiple transfer rates, comprising the steps of (a) performing a signal de-spreading operation and signal reproducing operation using a channel estimation value with respect to inputted received signals for the respective users or paths; (b) summing the reproduced signals for the respective users or paths on a corresponding receive time axis and subtracting the summed signals from the inputted receive signals to generate remaining signals; and (c) summing the remaining signals and the received signals for the respective users or said paths to generate signals from which interference is cancelled and performing a de-spreading operation on the interference cancelled signals; wherein said steps (a), (b) and (c) are repeated only to perform the designate operations as to the input signals to provide the operation result to a next step.

The present invention can sequentially perform a parallel interference cancellation in the unit of received bit and improve the accuracy of the detection for a portion in which signals are overlapped asynchronously. Also, the present invention performs a parallel process by dividing the processing units into several basic calculation units (processing units) and then allocating several processors (pipes) each responsible for designated calculation. Thus, the present invention can improve the processing speed and minimize the system time delay associated with the process. Further, as respective processing units are designed into modules so that they can be easily applied to a system having multiple transfer rates and the modules can be repeated to match the shorter period of signals to the longest bit period, the present invention can easily implement a parallel interference canceller in a system using multiples transfer rates.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF THE INVENTION

The present invention will be described in detail by way of a preferred embodiment with reference to accompanying drawings, in which like reference numerals are used to identify the same or similar parts.

Figure 1:
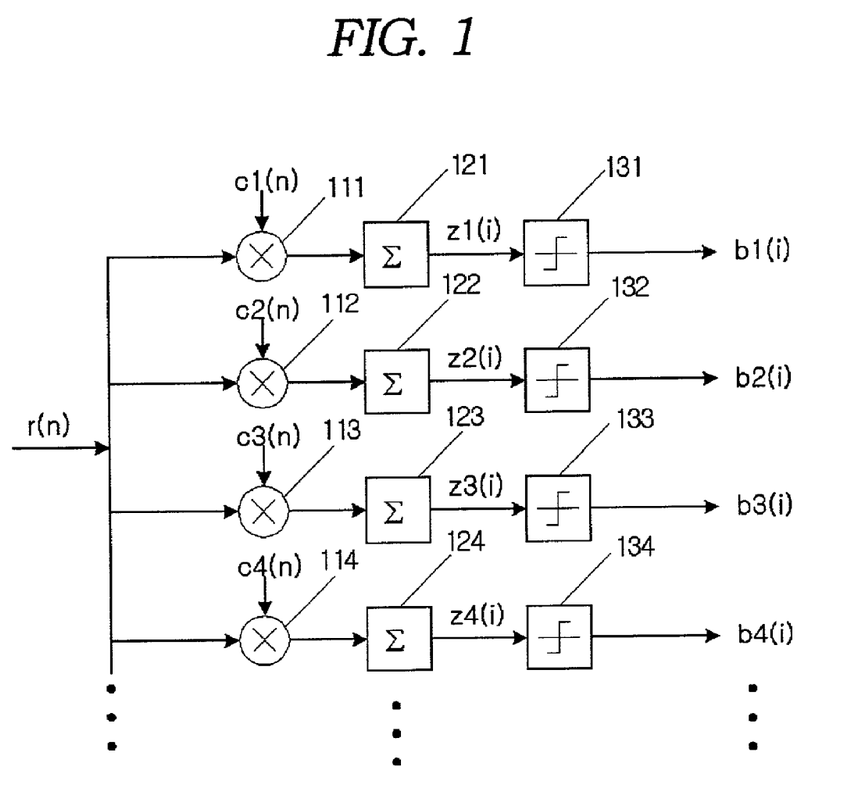
FIG. 1 illustrates a receiver in a conventional CDMA system.

FIG. 1 illustrates a receiver in a conventional CDMA system. Received signals r(n) are the signals spread by specific codes and they are received in an overlapping manner. The received signals and respective code sequences cl(n)~c4(n) are multiplied (111, 112, 113 and 114). The results are added by one bit unit length (121, 122, 123 and 124) to produce signal de-spread into respective user signals. Then, the de-spread signals are inputted to decision processors 131, 132, 133 and 134 for extracting original data information.

In these procedures, however, as respective user's spread code sequences do not have an exactly orthogonal characteristic or signal of the same user is received via different propagation paths, these received signals contain interference signals. These interference signals limit the service capacity of the entire system or degrade the quality of communication. Therefore, intensive researches have been made to effectively cancel the interference signals.

The present invention proposes a method of implementing a parallel interference canceller in a receiver having an asynchronous multiple transfer rates.

Figure 2:
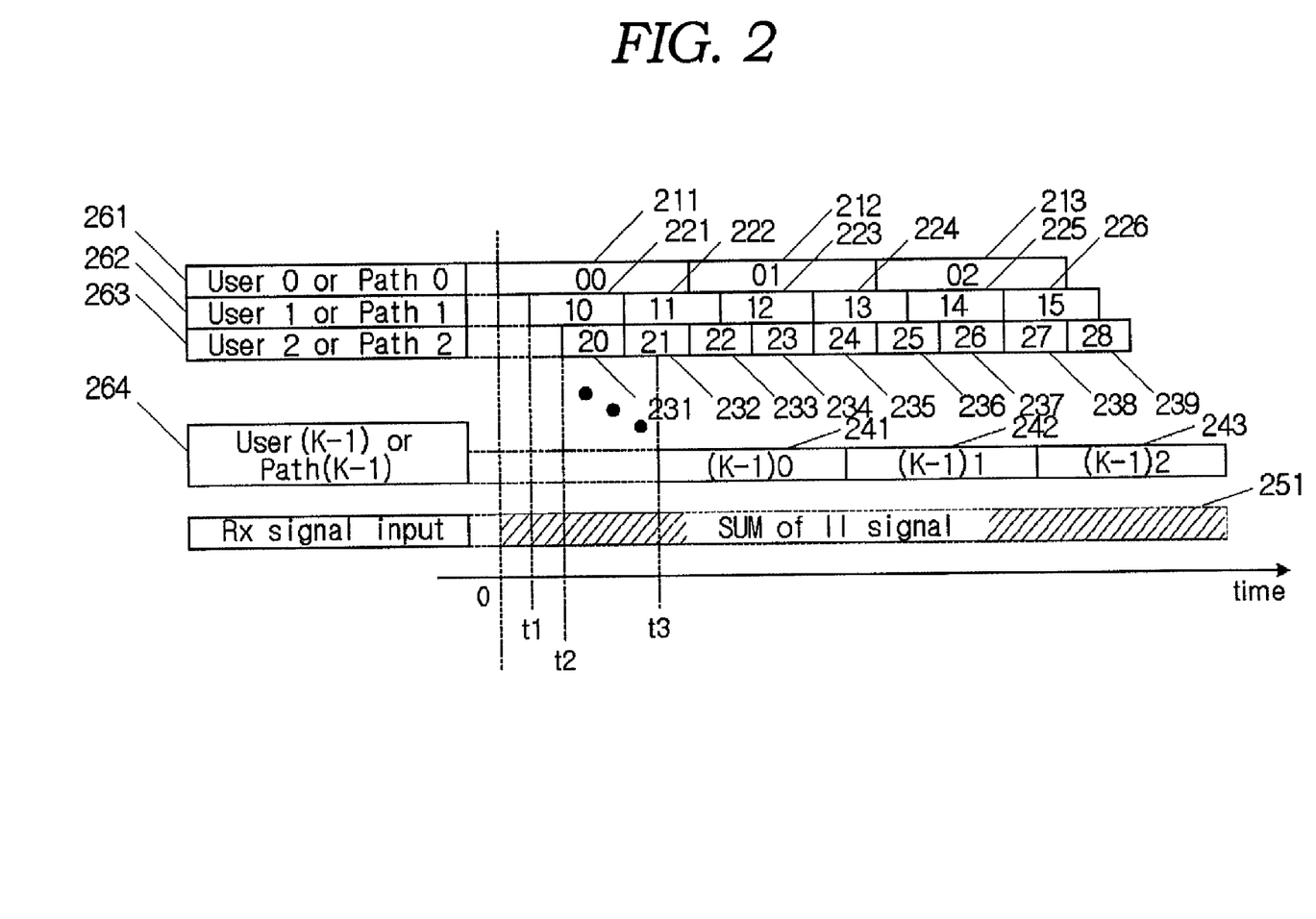
FIG. 2 illustrates the structure of asynchronous signals received with multiple transfer rates.

FIG. 2 illustrates the structure of asynchronous signals received with multiple transfer rates. In the drawing, reference numerals 261, 262, 263 and 264 indicates multiple access signals for users or propagation paths. From the drawing, it can be seen that user 1 or path 1 262 (hereinafter called "user 1") has a transfer rate twice of user 0 or a path 0 261 (hereinafter called "user 0"), and user 2 or path 2 263 (hereinafter called "user 2") has four times transfer rate than user 0 261. User k-1 or path k-1 264 (hereinafter called "user k-1") has the same transfer rate to the user 0 261. As such, the transmission environment using various transfer rates for users is called multiple transfer rates CDMA environment. FIG. 2 illustrates an asynchronous signal reception environment in which the signals have different propagation delays and respective spread bit information is not arranged in the time domain.

Reference numeral 211 indicates a spread signal for the first bit 00 of the user 0 261, reference numeral 212 indicates a spread signal for the second bit 01 of the user 0 261 and reference numeral 213 indicates a spread signal for the third bit 03 of the user 0 261. Also, reference numerals 221, 222, 223, 224, 225 and 226 are spread signals for the first to sixth bit of the user 1 262, which are received with a delay of t1 compared to those of the user 0 261. In addition, reference numerals 231, 232, 233, 234, 235, 236, 237, 238 and 239 are spread signals for the first to ninth bit of the user 2 263, which are received with a delay of t2 compared to the signals of the user 0 261. Further, 241, 242 and 243 are spread signals for the first to third bit of the user k-1 264, which are received with a delay of t3 compared to the signals of the user 0 261. At this time, it is assumed that initial synchronization for respective users (an user means an user or a path unless not mentioned specifically) can be exactly performed. The relative time delay between other users are defined to be t1, t2 and t3, respectively, with respect to the signals of user 0 261 which first arrived. If these spread signals are summed in the time domain, one SUM of all signal such as 251 is obtained.

Figure 3:
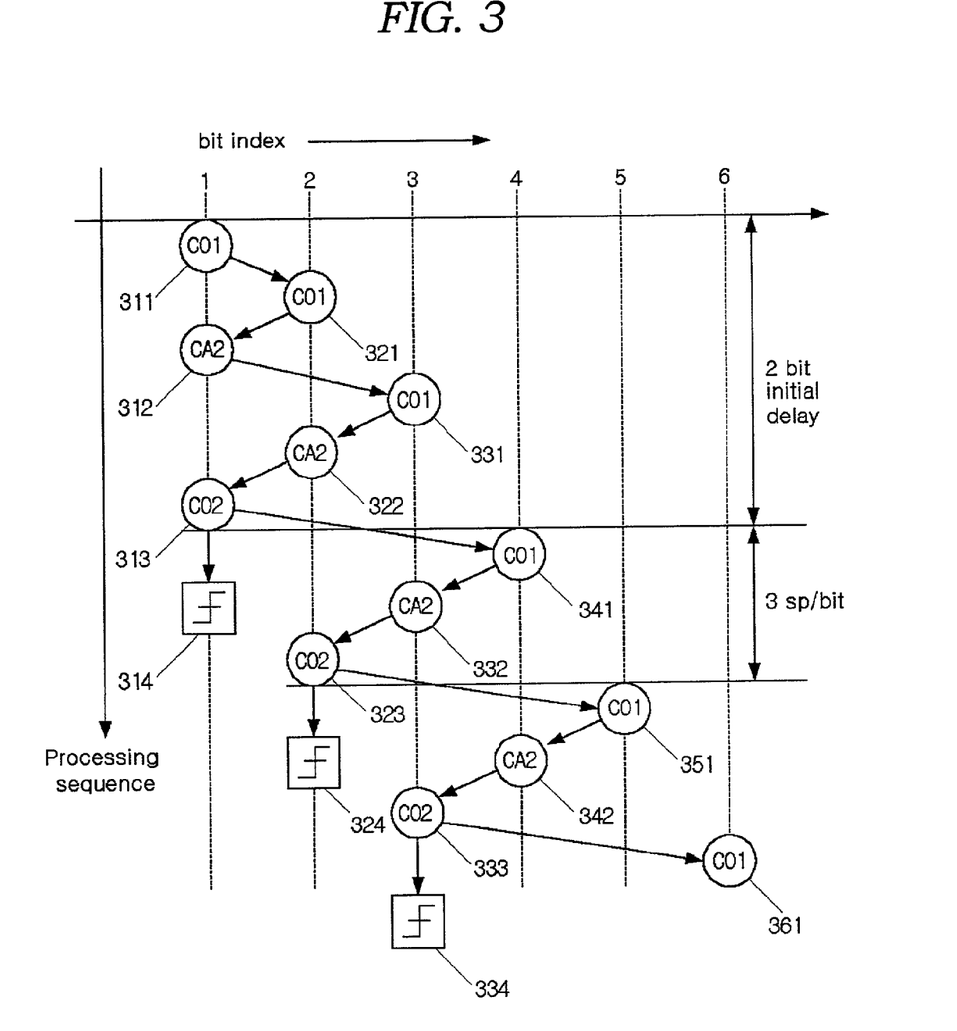
FIG. 3 is a flowchart illustrating a process of canceling sequential asynchronous interference signals according to one embodiment of the present invention.

FIG. 3 is a flowchart illustrating a process of sequentially canceling asynchronous interference signals according to one embodiment of the present invention. FIG. 3 shows the case that a parallel interference canceller is added to a conventional matching receiver.

In the drawing, a bit index represents the first bit, the second bit, . . . , for respective users in FIG. 2. Bit 1 in FIG. 3 indicates spread information for the bit 211, 221, 231 and 241 in FIG. 2. Under multiple transfers rate environment the spread length varies depending on the spread gain. However, as the minimum unit of information detection is a bit, the spread bit information is processed twice than the spread bit information having the greatest spread gain when the spread bit information has a lower spread gain than a predetermined level required for interference cancellation. In the present invention, further explanation on this calculation process is omitted. In FIG. 2, as the transfer information of user 262 includes exact two spread bit information in the time period compared to user 261, processes such as CO1, CA2, CO2 and bit decisions 314, 324, 334 in FIG. 3 are performed twice for user 262 depending on the spread gain of respective user bits, while processing 1 bit of the user 261. Thus, in the following description, the operation repeating the processed depending on the spread gain for respective users will be explained.

In FIG. 3, CO1 311, 321, 331, 341, 351 and 361 indicate common matching receivers. Each of the matching receivers de-spreads the spread signals for each user. This operation corresponds to the stages 111 and 121 in FIG. 1. At this time, two processes are added to cancel interference in one stage, which are CA2 312, 322, 332 and 342, and CO2 313, 323 and 333. The process CA2 312, 322, 332 and 342 indicates a series of process of first reproducing signal information for respective users using the de-spreading signals, then adding all of them in the same time axis and finally subtracting the added result from the received signals to produce remaining signals.

The process CO2 313, 323 and 333 indicates a series of process of summing the remaining signals generated in CA2 312, 322, 332 and 342 and the reproduced signals in the CO1 and then inputting the signals to demodulators of respective users for de-spreading thereof.

As such, as interference signals are cancelled from the received signals and information is determined according to the bit decision rule using the de-spreading result (314, 324 334), this method has an improved reception capability compared to a method in which determination is made from the received signals before interference is cancelled.

FIG. 3 shows a procedure of performing this parallel interference cancellation method in an asynchronous receiving channel in a bit unit. The initial time delay is 2 bit for the interference canceller in the first stage. Processing units (which include CO1, CA2 or CO2) necessary to detect one bit are 3 units.

Figure 4:
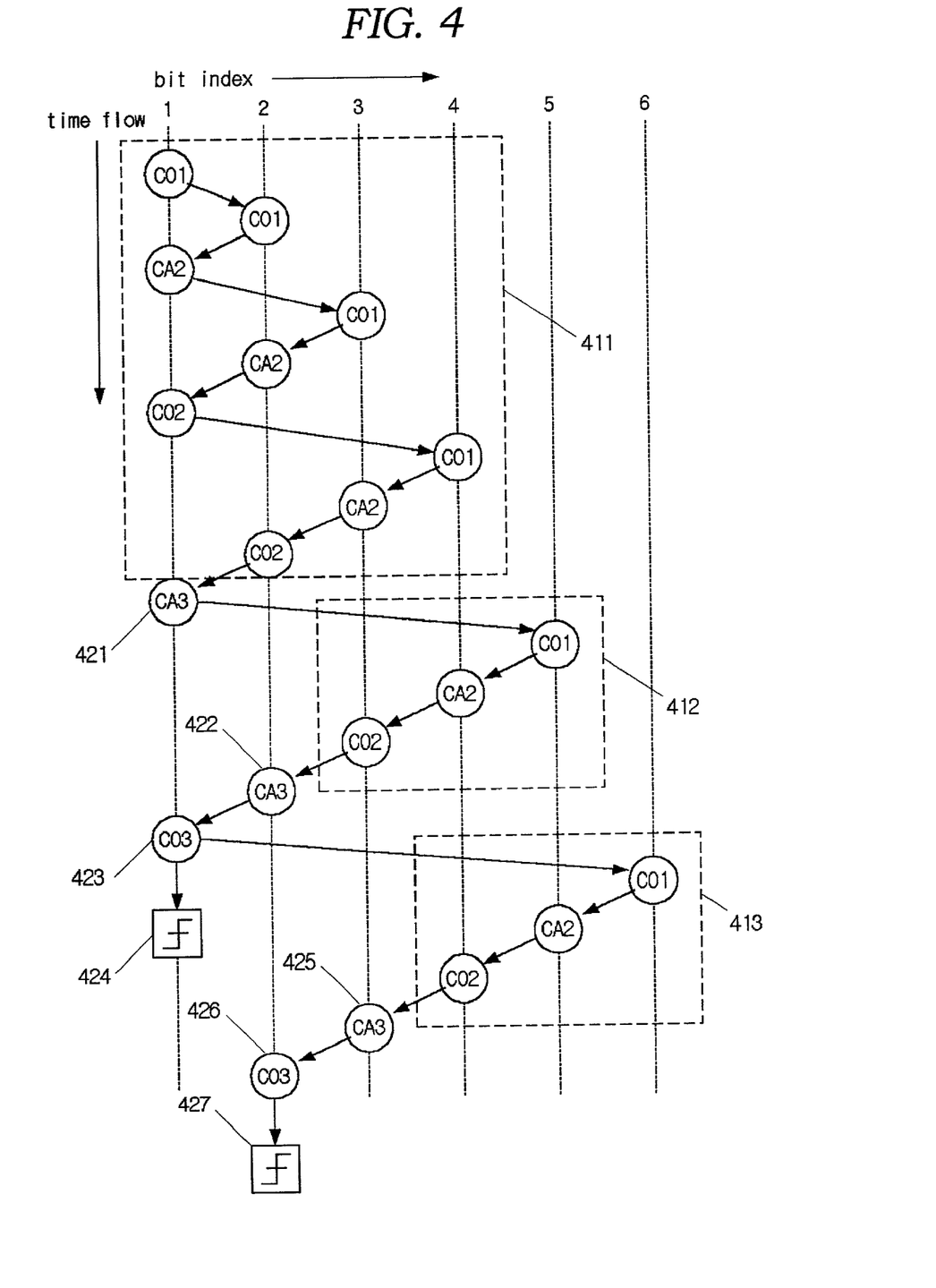
FIG. 4 is a data processing flow when the present invention is implemented in a multiple-stage structure.

FIG. 4 illustrates the case where the interference cancellation is performed in 2 stages. The number of stages of an interference canceller indicates the number of stages added to a common matching receiver. Stating that the number of the interference canceller stages is 2 means that two-stage interference cancellers are added to an existing common matching receiver stage. Therefore, the entire process becomes 3 stages.

In FIG. 4, CO1 represents a common matching receiver. FIG. 4 shows two interference cancellation stages in which an interference cancellation stages consisting of CA2 and CO2 and another interference cancellation stage consisting of CA3 and CO3 are added to a matching receiver. FIG. 4 shows that the process structure including additional interference cancellation stage can be obtained by expanding the structure shown in FIG. 3. That is, reference numeral 411 indicating the initial process procedure is same as FIG. 3. Also, the procedures 412 and 413 for processing the detected bits in FIG. 3 are same in FIG. 4. As the number of stages of the interference canceller is increased by one, a process of CA3 is added after the process CO2 in 411, 412 and 413 is added. After the processes, a process of CO3 is added. The processes of CA3 and CO3 are the same as the CA2 and CO2 process mentioned above. As such, if the number of the interference cancellation stage is added, as a bit decision can be made using signals from which interference components not more completely cancelled, the BER characteristic of the receiver can be further improved. However, the addition of processing stages increases the initial time delay.

Figure 5:
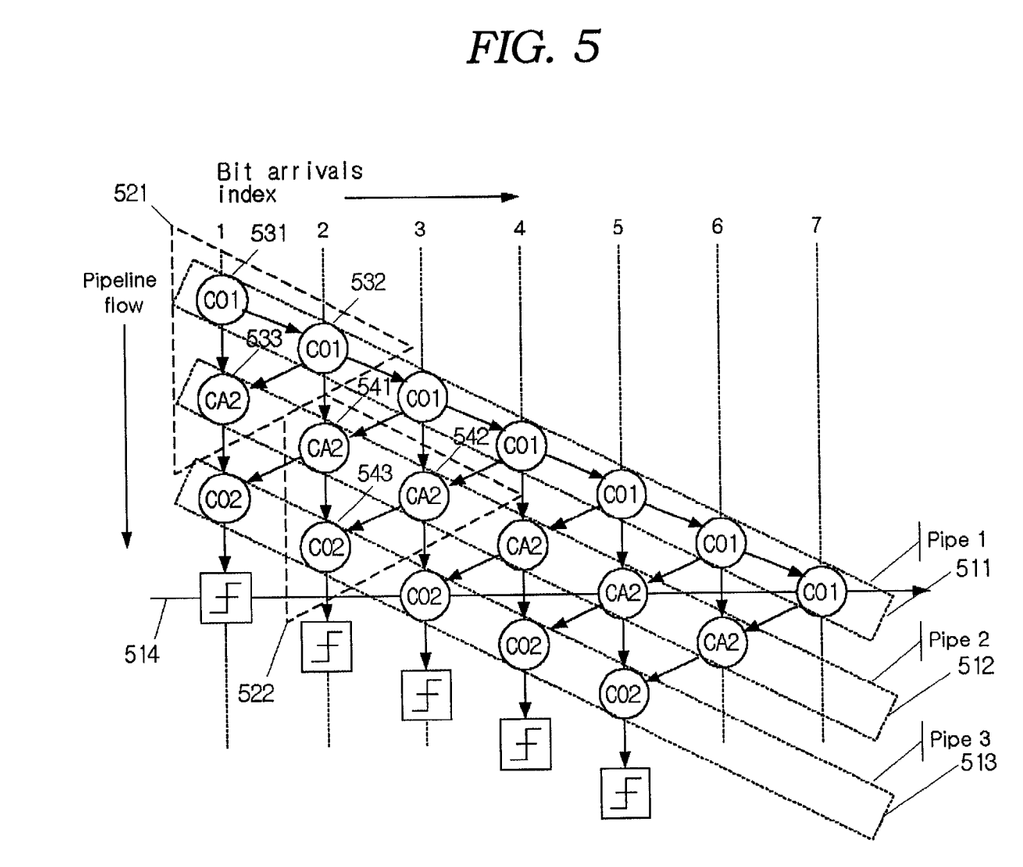
FIG. 5 is a data processing flow when the present invention is implemented in a parallel processing structure.

FIG. 5 illustrates a pipeline processing structure proposed by the present invention to implement the above-mentioned process in an actual system.

In a triangle 521, CA2 533 performs a calculation process with respect to the processing result of CO1 531 for the current bit and the processing result of CO1 532 for the previous bit. Meanwhile, CO2 543 in the triangle 522 performs a calculation process with respect to the processing result of CA2 541 for the current bit and the processing result of CA2 542 for the previous bit.

Viewing these procedures on the time axis 514, four mutually independent processes are performed at the same time. That is, as these processes are independent to each other, they allow a parallel processing. Each process consists of the same calculation process. One processing result in the previous process is delayed by one processing period, and used in the following process. That is, the pipe 1 511 repeatedly performs only CO1 process with respect to consecutive input signals. In pipe 2 512, the process of CA2 is performed as to the result of CO1 with a delay of one processing unit. Also, in pipe 3 513, the process of CO2 is performed as to the result of CA2 with a delay of one processing unit.

In the present invention, the operation load of a general parallel interference cancellation is distributed over a plurality of processing units 531, 533 and 543. Considering the procedure of sequentially processing the bit information of received signals in this distributed calculation processing units, the process flow as shown in FIG. 3 or FIG. 4 is converted into a pipeline structure as shown in FIG. 5. The characteristic of this processing structure is designed to repeat the same calculation process using the output results of the inputted received signals and a preceding pipe (511 is a preceding pipe for 512 and 512 is a preceding pipe for 513), assuming that each calculation processing unit is defined as one pipeline. Thus, this processing structure can be easily implemented with PLD and ASIC and improve the processing speed. Also, as the interconnection between them is sequentially conveyed to the next pipe with a time delay of one processing unit, the processing structure can simplify the control structure.

Meanwhile, respective pipes are sequentially connected with one another and with a delay of one processing unit. At this time, the trigger time point between these pipes directly affects the processing speed of the entire system. In the present invention, a method of controlling data buffering is proposed to provide a method for optimal control of the connection time point of these pipes.

Figure 6:
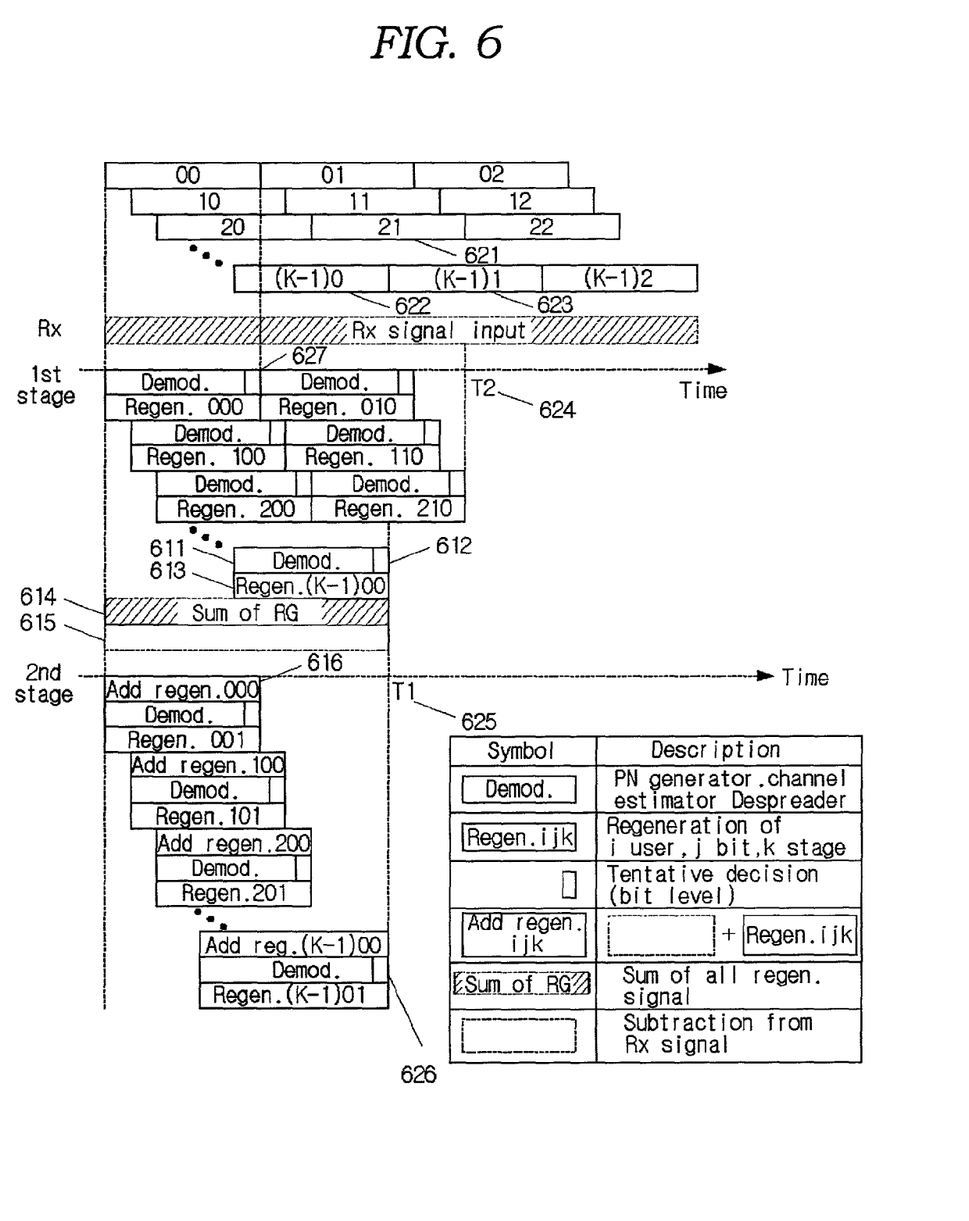
FIG. 6 illustrates a data buffer control method using the interference cancellation method according to one embodiment of the present invention.

FIG. 6 illustrates a detailed process flow for estimating an optimum connection time point between the pipes in an interference canceller having a pipeline structure. FIG. 6 illustrates a structure using one interference canceller. First, the processing structure using multiple transfer rates is same as the present invention, except that respective processes are repeated according to the process gains. Thus, this embodiment will be explained with an example using a single transfer rate.

First, respective blocks in FIG. 6 will be described. A reference numeral 611 is a process of de-spreading the received signals pursuant to the spread code and the phase of a user. As a result, a demodulated output value such as 612 is obtained. The output value of 612 and the channel estimation value are used to reproduce a corresponding user signal, which is depicted as 613. The sum of the signals reproduced by performing this procedure to all users on the same time axis is depicted as 614. As a result of subtracting these signals from the received signals, remaining signals depicted as 615 are obtained. Meanwhile, summing the remaining signals 615 to the reproduced signals 613 for respective user, signal 616 is obtained. The signal 616 thus obtained is an improved input signal from which interference signals from other users are cancelled from the received signals. As such, the improved input signals are de-spread in the demodulator, thus increasing the receive capability.

In the drawing, a reference numeral 00 indicates the $0^{th}$ bit of the $0^{th}$ user. This is depicted as 000 in the interference cancellation stages with one more digit attached thereto. This means an interference cancellation process of the $0^{th}$ bit of the $0^{th}$ user at the $0^{th}$ stage. In this processing structure, the connection time point between respective pipes may be defined to be T2 624 and T1 625. T2 indicates the receive signal input time point for detecting one bit from all users, in case that the number of interference cancellation stage is one. In other words, in FIG. 5, T2 indicates the processing completion time point of pipes 1 and 2 before starting a process at pipe 3. Meanwhile, T1 indicates the minimum data unit necessary to detect bits at the corresponding final stage when the inputted receive signals is processed in T2 in previous stages. This means that the next stage will not start an interference cancellation until data up to T1 is prepared. In order to satisfy this condition, remaining signal data up to T1 should be prepared. For this, reproduction signals for the first bit information must be prepared on the same time axis for all users.

However, the $K-1^{th}$ user's $0^{th}$ bit 622 arrived most late coexists with the next time bits of other users on the time axis. In other words, the (K−1)0 bit overlaps with 20, 10 and 00 bits and also overlaps with 21, 11 and 01. Although the reproduction signals are provided for (K−1)0 bits 622, the reproduction signals for 21, 11 and 01 bits have not been generated at this time point. Thus, it is not until the reproduction 627 of the fastest user bit information (i.e. 00 bit) is completed, that the reproduction signals for all users are prepared on the time axis. Therefore, remaining signals up to the location 627 are generated. However, as the stage interference cancellation could not proceed with these signals, a demodulation and reproduction of other user bits overlapping with 62 on the time axis are required. Therefore, as reproduction for of the bit information of all other users overlapping with 622 is completed at the time point of T2, remaining signals up to the time point of T1 are prepared. Thus, an interference cancellation at the next stage may be performed.

Therefore, T2 means the input time point of the minimum data necessary for interference cancellation in the next stage. This means an optimum connection time point at which the processing speed between the pipes mentioned above is maximized. Meanwhile, the pipe 2 in FIG. 5 may be viewed as a pipe for delaying the process of pipe 1 by one processing unit from a processing point of view. As the calculation content is a simple process of summing reproduction signals for respective user and of subtracting them from the received signals, it is reasonable to include the process of pipe 2 in pipe 1 in the actual process. In this point of view, it is assumed that the pipe 1 and the pipe 2 are combined with each other. Thus, after two CO1s of the pipe 1 are processed, the CA2 of the pipe 2 is processed using the signals reproduced from them. Thus, in an actual system, T1 and T2 can be defined as follows.

T2 is set as the time point at which the demodulation of the latest bit information 621 of the portion overlapping with the user information bit 622 is completed. T1 is set as the time point at which reproduction signals for all user signals and remaining signals are prepared, with respect to the user information bit 622 arriving last among the user signals entering the interference canceller.

In the relation between T1 and T3 defined as such and the connection time point of each of the pipes, T1 means the trigger time point of the pipe 3. This time point corresponds to the processing completion time of pipes 1 and 2 when they are viewed as the same element as mentioned above. Processing time of these pipes 1 and 2 is T2 with respect to the time of signal input. That is, T1 and T2 are different from the input/output point of view. From a viewpoint of pipe connection, however, they can be considered to be the same time point. In other words, when the pointer of a data buffer for the received input signals reaches T2 when using a data processing buffer, if the result of processing the pipes 1 and 2 up to this time point becomes a trigger time point for the process of pipe 3, it also becomes the connection time point between the pipes capable of minimizing the time delay until the final processing stage.

Figure 7:
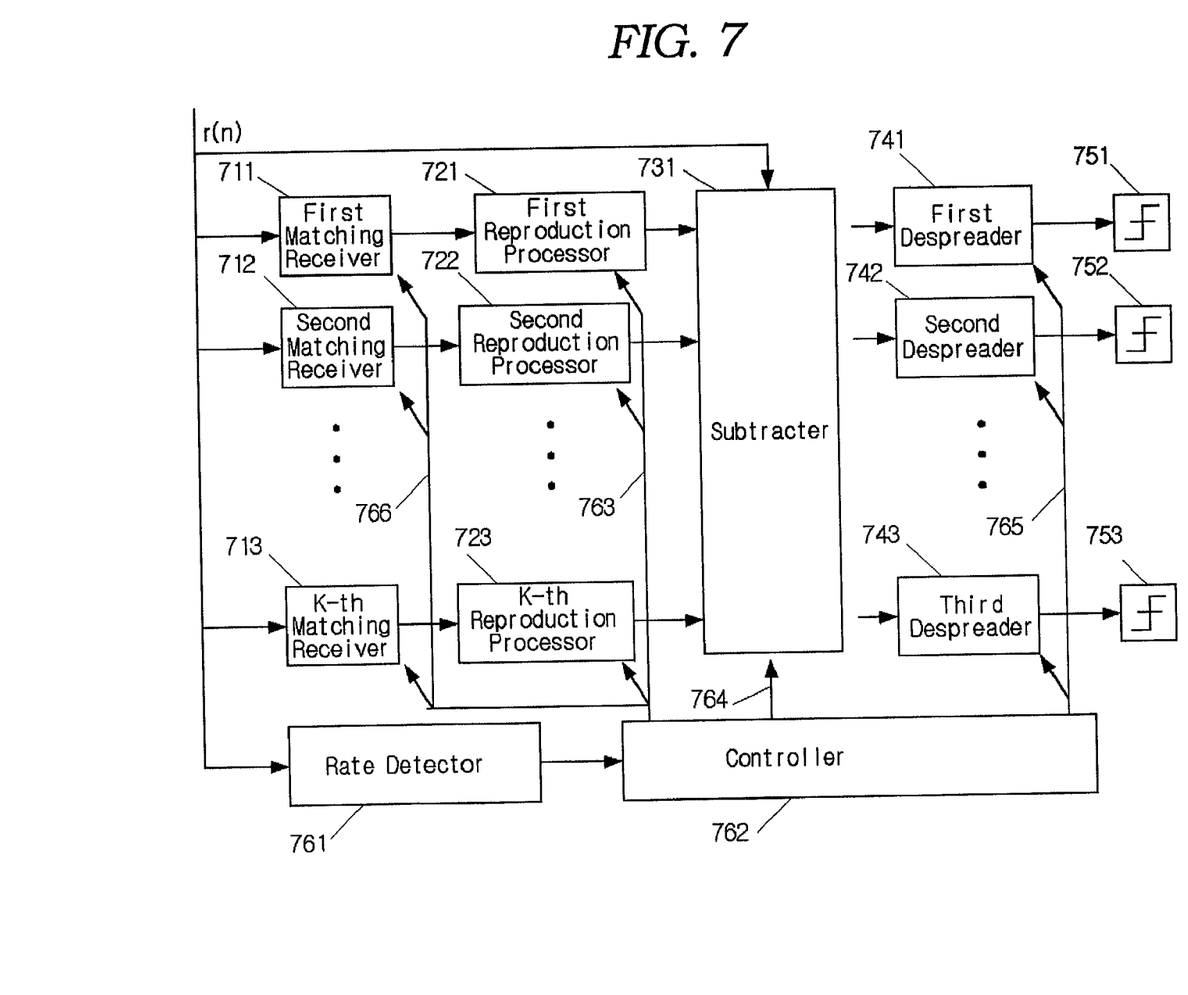
FIG. 7 is a construction of a CDMA parallel interference cancellation apparatus to which the present invention is applicable.

FIG. 7 is a construction of a CDMA parallel interference cancellation apparatus to which to the present invention is applicable. The CDMA parallel interference cancellation apparatus includes existing matching receivers 711, 712, 713, bit decision devices 751, 752, 753, and interference cancellers 721, 722, 723, 731. Also, the CDMA parallel interference cancellation apparatus further includes a rate detector 761 for detecting multiple rates for respective users and the starting points of asynchronous transmission, and a controller 762 for controlling the operation of interference cancellers and the connection between the pipes using these information.

The rate detector 761 performs initial synchronization of multiple access users being serviced, and obtains multi-rate and initial phase information depending on the spread gain of each user. This information can be obtained from other components of the system. The controller 762 determines the order of the users according to their phase. The controller 762 also obtains information on how many times the process must be repeated with respect to a short spread data column and a long spread data column depending on the spread gains of respective users. Also, the controller 762 defines T1 and T2 mentioned above based on the time point at which demodulation of data for a certain user is completed.

Referring to the connection time point between the pipes, the subtractor 731 performs an interference cancellation operation to generate signals from which interference is cancelled using the remaining signals. The de-spreader 741, 742 and 743 performs a de-spreading process and also performs bit decisions 751, 752 and 753 with their output signals. Comparing them with the structure of the pipe, the matching receivers 711, 712 and 713 and the signal reproduction processors 721, 722 and 723 performing a de-spreading process corresponds to the pipe 1 for repeatedly performing the process of CO1. On the other hand, the process 731 for summing these reproduced signals and subtracting them from the receive signals corresponds to pipe 2 for performing the process of CA2. Also, the de-spreading process 741, 742 and 743 using their signals as an input corresponds to the pipe 3 for performing the process of CO2. The connection time points of these pipes are determined to make each pipe operate in cooperation with each other with the repetition number and T2 and T1 determined based on the spread gain of respective users.

As mentioned above, the present invention has the following advantages. First, as respective processing units are divided into a pipeline structure and these pipes are correlated with a constant time delay, the entire process is significantly simplified. Therefore, implementation of the present invention into logic devices such as ASIC or PLD becomes easy. Second, as each pipe only repeats simplified process of its own, the entire processing speed can be accelerated. Third, as the connection time point between the pipes can be optimally controlled, the time delay for interference cancellation can be minimized. Fourth, when adding an interference cancellation stage, it is sufficient to simply add a pipe to the existing pipe structure without altering them. Thus, a flexible parallel interference canceller having the extendibility can be designed and implemented.

The present invention has been described with reference to a particular embodiment in connection with a particular application. Those having ordinary skill in the art and access to the teachings of the present invention will recognize additional modifications and applications within the scope thereof.

It is therefore intended by the appended claims to cover any and all such applications, modifications, and embodiments within the scope of the present invention.

What is claimed:

1. A parallel interference cancellation apparatus for sequentially canceling interference in asynchronous signals received from respective users or paths in a code division multiple access system using multiple transfer rates, the apparatus comprising:

a signal reproducing means for performing de-spreading operation of the received signals from the respective users or paths and then reproducing said signals using a channel estimation value;

a remaining signal generating means for summing said reproduced signals on a corresponding receive time axis and subtracting said summed signals from said input received signals to generate remaining signals;

a de-spreading means for summing the remaining signals generated by said remaining signal generating means to said signals from the respective users or paths to generate signals from which interference is cancelled and for performing a de-spreading operation on the interference cancelled signals;

a rate detection means for receiving the signals from respective users or paths to detect multiple transmission rates and an asynchronous trigger point for respective users; and a controller for controlling said signal reproduction means, said remaining signal generating means and said de-spreading means using said multiple rates and said asynchronous trigger point for respective users.

2. The parallel interference cancellation apparatus according to claim 1, wherein during the time when one period of a signal having the longest bit period among said signals received with multiple transfer rates, other signals having a shorter period is repeatedly processed by said signal reproduction means, said remaining signal generating means and said de-spreading means to match the period of the signals to that of the signal having the longest period before canceling the interference from the signals.

3. The parallel interference cancellation apparatus according to claim 1, wherein the process of said remaining signal generating means starts when said signal reproducing means completes the reproduction of the signal having the fastest phase among the signals received from the respective users or paths.

4. The parallel interference cancellation apparatus according to claim 1, wherein said remaining signal generating means provides said reproduced signals to said de-spreading means when the reproduction of a portion of the signals for a user or a path having the most late phase is completed, and said portion of the signal overlapping with the signals received from a previous user or a previous path having the most late phase in a time axis.

5. The parallel interference cancellation apparatus according to claim 1, wherein a plurality of said signal reproducing means, said remaining signal generating means and said de-spreading means constitutes a multi-stage structure.

6. A method for sequentially canceling interference of asynchronous signals received from respective users or paths a code division multiple access system using multiple transfer rates, said method comprising the steps of:

(a) performing a signal de-spreading operation and signal reproducing operation, to produce reproduced signals, using a channel estimation value with respect to the signals received from the respective users or paths;

(b) summing said reproduced signals of the respective users or paths on a corresponding time axis and subtracting the sum of said reproduced signals from the signals received from the respective users or paths to generate remaining signals; and (c) summing said remaining signals and said signals received from the respective users or paths to generate signals from which interference is cancelled and performing a de-spreading operation to the interference cancelled signals;

wherein each of said steps (a), (b) and (c) are repeated only to perform the designate operations with respect to the input signals to provide the operation result to a next step.

7. The method for sequentially canceling parallel interference according to claim 6, wherein said step (b) starts when the reproduction of signals having the fastest phase among the received signals for the respective users or paths is completed in said step (a).

8. The method for sequentially canceling parallel interference according to claim 6, wherein said step (c) starts when the reproduction operation is completed with respect a portion of the signals having the most late phase among the signals from a user or a path overlapping in the time axis with the signals for a previous user or a previous path having the most late phase.

9. The method for sequentially canceling parallel interference according to claim 6, wherein while processing one period of signals having the longest bit period among signals received at multiple transfer rates, said steps (a) to (c) are repeatedly performed with respect to signals having shorter period to match the period of signals to the longest signal period.

10. The method for sequentially canceling parallel interference according to claim 6, wherein each of said steps (a) to (c) are repeatedly performed in a multi-stage structure.

* * * * *